UNITED STATES PATENT OFFICE.

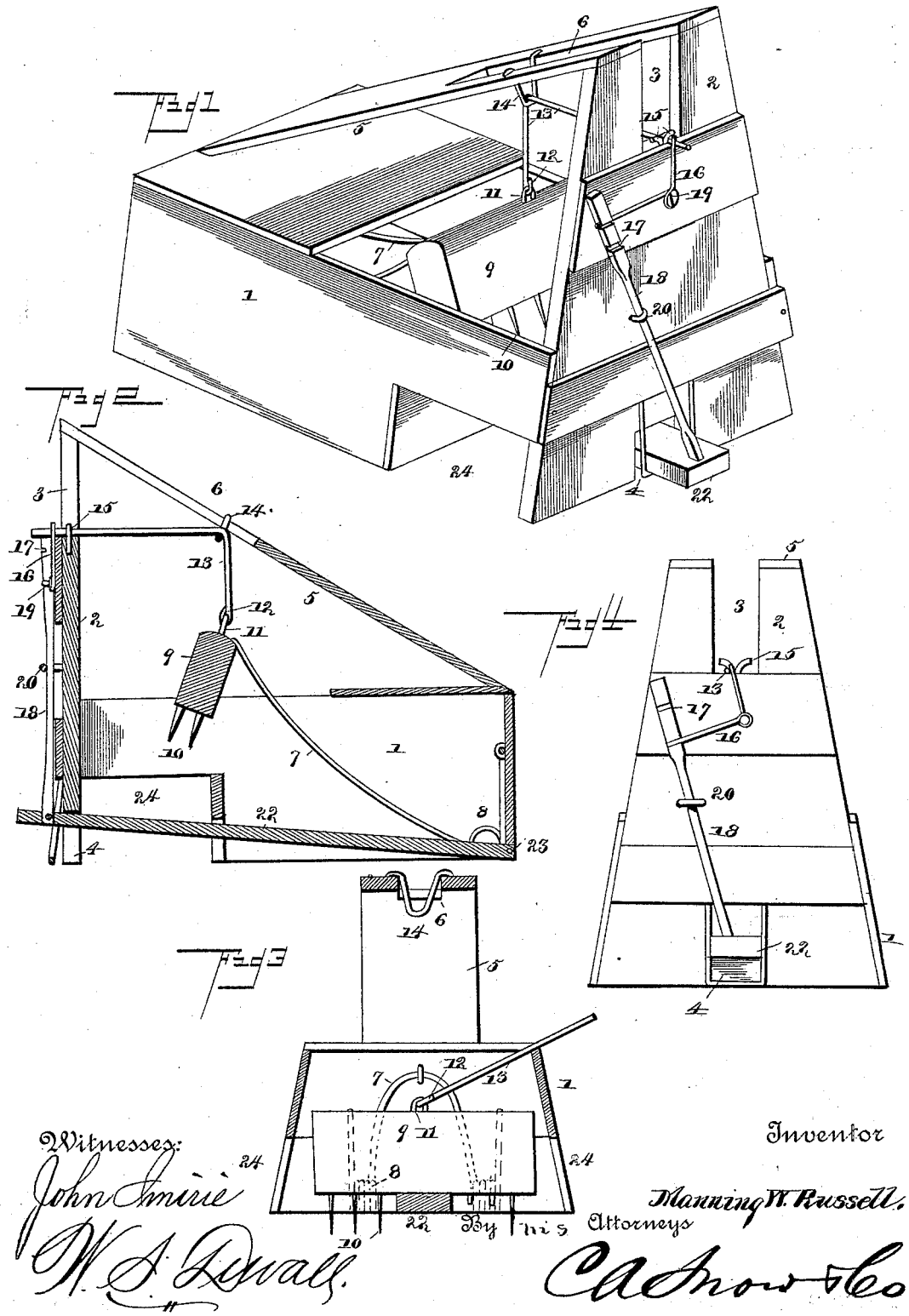

MANNING W. RUSSELL, OF HOMER, LOUISIANA.

ANIMAL-TRAP.

SPECIFICATION forming part of Letters Patent No. 422,253, dated February 25, 1890.

Application filed November 9, 1889. Serial No. 329,740. (No model.)

*To all whom it may concern:*

Be it known that I, MANNING W. RUSSELL, a citizen of the United States, residing at Homer, in the parish of Claiborne and State of Louisiana, have invented a new and useful Trap, of which the following is a specification.

This invention has relation to traps of that class known as "impalement," and is designed for the capture and impalement of small animals, such as rats, moles, and other vermin.

The invention consists in certain features of construction hereinafter specified, and particularly pointed out in the claims.

Referring to the drawings, Figure 1 is a perspective of a trap constructed in accordance with my invention. Fig. 2 is a central vertical section. Fig. 3 is a transverse section. Fig. 4 is a front elevation.

Like numerals of reference indicate like parts in all the figures of the drawings.

1 represents a rectangular box, the forward or front wall of which is extended above the same and forms a standard 2, the upper end of which is bifurcated, as at 3, and the lower end of which is likewise bifurcated, as at 4. An inclined bar 5 connects the upper ends of the bifurcations 3 with the rear end of the box, which bar at its forward end is bifurcated, as at 6, to agree with the bifurcation 3.

7 represents a spring-bail, and the same consists of a spring-wire bent upon itself at its middle and secured to the rear wall of the box, then coiled, as at 8, at each side of its bent portion and having its terminals securely connected to a transverse head 9, located at the front of the box at the rear of the standard 2, and provided with a series of depending sharpened impaling-spikes 10. An eye 11 is provided at the upper end of the block, and loosely interlocking therewith is an eye 12, formed on the rear end of an L-shaped arm 13, fulcrumed in a suspension bail or staple 14, depending from the bifurcations 6 of the inclined bar 5, the forward end of the L-shaped bar extending between the bifurcations 3 and being designed to be inserted under either side of a double-L-shaped keeper 15.

16 represents a bell-crank trigger, one branch of which is adapted to take against either side of the L-shaped bar in accordance with the keeper under which the bar is inserted, and the opposite branch of which is adapted to be engaged with either one of a series of notches 17, formed in the upper front edge of a vertically-reciprocating bar 18. A screw 19 serves as a pivot for the bell-crank trigger, and the reciprocating bar is guided by a staple 20 and supported at its lower end at the front end of a releasing-lever 22, the rear end of which is hinged or pivoted, as at 23, to the rear lower wall of the box, the front end of said lever extending beyond the standard 2 and being limited in its swing by a bail 23, depending from said standard.

Openings 24 are formed in the side walls of the box, and through the same and into the box pass the animals to be captured, exclusive of those animals which are captured in their burrow.

To set the trap for moles and other burrowing animals, the L-shaped bar is swung down at its front end and under the right-hand keeper, and the upper branch of the bell-crank trigger is swung to the opposite side of the bar, the lower branch of said trigger engaging the upper notch in the reciprocating bar. The trap as set is placed over the burrow of the mole, and when the mole passes under the same it raises the releasing-lever and reciprocates the bar, disengaging the L-shaped bar from its keeper and permitting the spring-bail to actuate the spiked head, and thus the animal is captured.

In employing the trap for such animals as rats, minks, &c., the upper branch of the bell-crank trigger is swung to the opposite side of the L-shaped bar, which L-shaped bar is engaged by the opposite or that keeper located at the left of the trap, and the lower arm of the trigger is engaged by the lower notch of the series, and thus the pivoted releasing bar or lever is supported above its limiting-bail, and upon the releasing-lever is mounted the bait. The animal coming in the opening 24 is attracted by the bait, and by exerting its weight upon the releasing-lever draws the same down and actuates the bell-crank trigger, and thus liberates the L-shaped bar and permits the spiked head to descend, thus impaling the animal.

Having described my invention, what I claim is—

1. In a trap of the class described, a box, a spring-arm connected to the box, a spiked head secured to the free end of the arm, an L-shaped lever fulcrumed and loosely secured to the head, a double keeper located in the path of the L-shaped bar, in combination with a pivoted bell-cranked trigger adapted to liberate the bar, and a reciprocating notched bar adapted to engage the opposite terminal of the bell-crank, a pivoted liberating-lever extended at its forward end and supporting the reciprocating bar, and a guide for said bar, substantially as specified.

2. In a trap of the class described, the combination, with a box, the forward end of which is extended to form a standard and bifurcated at its upper and lower ends, a bifurcated inclined bar connecting the upper end of the standard with the box, and a staple or bail depending from the bifurcation of the bar, of a spring-bail having its rear end connected to the wall of the box oppositely coiled and carrying at its free end a spiked head, an eye mounted on the head, an L-shaped bar having at its rear end an eye interlocking with that of the head and fulcrumed in the staple-keepers mounted in the bifurcation of the standard, a pivoted bell-cranked trigger secured to the standard and adapted to liberate the L-shaped bar from the keepers, a pivoted releasing-lever secured to the rear end of the box extended under the head and projecting in front of the standard, and a reciprocating notched bar extending upwardly from the releasing-lever and adapted to engage the lower arm of the bell-crank, substantially as specified.

In testimony that I claim the foregoing as my own I have hereto affixed my signature in presence of two witnesses.

MANNING W. RUSSELL.

Witnesses:
 F. A. HILLEY,
 J. R. RAMSEY.